(12) United States Patent
Taylor et al.

US008029187B2

(10) Patent No.: US 8,029,187 B2
(45) Date of Patent: Oct. 4, 2011

(54) APPARATUS, SYSTEM AND METHOD FOR HIGH RESOLUTION IDENTIFICATION WITH TEMPERATURE DEPENDENT RESISTIVE DEVICE

(75) Inventors: John P. Taylor, San Diego, CA (US); Jeffrey M. Thoma, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 1261 days.

(21) Appl. No.: 11/677,480

(22) Filed: Feb. 21, 2007

(65) Prior Publication Data

US 2008/0198898 A1    Aug. 21, 2008

(51) Int. Cl.
  *G01K 7/00*     (2006.01)
  *G01K 7/16*     (2006.01)
  *G01K 1/12*     (2006.01)

(52) U.S. Cl. ............. 374/141; 374/152; 374/1; 374/4; 374/57; 374/170; 702/130; 702/99; 324/760; 320/150

(58) Field of Classification Search ............ 374/141, 374/170–173, 1, 4–5, 43–45, 57, 100, 183, 374/185, 163, 29, 137, 166, 167; 702/130, 702/99, 85, 182, 188; 324/760–765, 721, 324/713, 429, 759, 636.1; 320/106, 150, 320/128, 130–132, 154, 114–115, 107, 134, 320/136
See application file for complete search history.

(56) References Cited

U.S. PATENT DOCUMENTS

| | | | | |
|---|---|---|---|---|
| 3,489,883 A | * | 1/1970 | McKinley | 219/505 |
| 4,392,101 A | * | 7/1983 | Saar et al. | 320/156 |
| 4,667,143 A | * | 5/1987 | Cooper et al. | 320/153 |
| 4,677,363 A | * | 6/1987 | Kopmann | 320/131 |
| 5,047,961 A | * | 9/1991 | Simonsen | 702/63 |
| 5,489,834 A | * | 2/1996 | Pitkanen | 320/106 |
| 5,656,917 A | * | 8/1997 | Theobald | 320/106 |
| 5,861,730 A | * | 1/1999 | Lee | 320/106 |
| 5,907,238 A | * | 5/1999 | Owerko et al. | 323/349 |
| 6,112,105 A | * | 8/2000 | Olsson | 455/572 |
| 2006/0259280 A1 | * | 11/2006 | Zaccaria | 702/188 |
| 2007/0263332 A1 | * | 11/2007 | Apfel | 361/90 |
| 2009/0051320 A1 | * | 2/2009 | Muntermann | 320/116 |
| 2010/0285571 A1 | * | 11/2010 | Coursey et al. | 435/286.1 |

FOREIGN PATENT DOCUMENTS

DE    2109819 B  *  3/1977

(Continued)

*Primary Examiner* — Gail Verbitsky

(57) ABSTRACT

A temperature measuring and identification (TMID) device obtains identification information and temperature information of a connected device having a temperature sensing circuit (TSC). The TSC includes a temperature sensing element (TSE) connected in parallel with a voltage clamping network (VCN) that limits the voltage across the TSE to an identification voltage within an identification voltage range when the voltage is greater than or equal to a lower voltage of the identification voltage range. When a voltage below the lower range is applied to the TSC, the VCN appears as an open circuit and the resistance of the TSC corresponds to temperature. A translation circuit within the TMID shifts TSC voltages within the identification voltage range to a normalization voltage range. Accordingly, voltages corresponding to temperature as well as voltages corresponding to identification are within the normalization voltage range. As a result, the resolution of a voltage sensing device used for measuring the temperature and identification voltages is maximized. In addition, the translation circuit maintains a minimal current during a rest state. For cost or other concerns, a first TSC may omit the VCN to provide a maximum identification voltage and other TSCs may include VCNs with lower identification voltage ranges.

15 Claims, 7 Drawing Sheets

FOREIGN PATENT DOCUMENTS

| | | | |
|---|---|---|---|
| JP | 5299987 A | * | 11/1993 |
| JP | 06 333604 | | 12/1994 |
| WO | WO 99/22433 | | 5/1999 |
| WO | WO 9927415 A1 | * | 6/1999 |

* cited by examiner

APPARATUS, SYSTEM AND METHOD FOR HIGH RESOLUTION IDENTIFICATION WITH TEMPERATURE DEPENDENT RESISTIVE DEVICE

TECHNICAL FIELD

The invention relates in general to temperature dependent resistive devices and more specifically to an apparatus, system, and method for high resolution identification with temperature dependent resistive devices.

BACKGROUND

Many systems and circuits utilize temperature sensing elements (TSEs) to determine a temperature of a device. For example, typical temperature dependent resistive devices (TDRD) such as thermistors may have resistances that are inversely proportional to temperature. By measuring the resistance of the thermistor, the temperature of the thermistor can be determined. As a result, temperatures of components and devices near the thermistor can also be determined or estimated. Resistance sensing techniques are sometimes used as identification techniques to determine the identity of a device, module, or other peripheral unit that is connected to a main device or main assembly. For example, portable communication devices that accept more than one type of modular battery include a battery identification technique to determine the type of battery that is connected to the portable communication device. In order to minimize components and contacts, conventional designs often combine temperature sensing techniques and identification techniques. For example, some conventional portable communication devices that accept more than one type of modular battery include a temperature sensing mechanism that connects to circuits within the battery packs to determine temperature and to identify the battery module. Each type of battery module includes thermistor circuits having different characteristics allowing the portable communication device to identify the particular battery module that is connected. Typically, each thermistor circuit has a resistance to temperature relationship that is offset from relationships of other thermistor circuits within other types of battery modules. Conventional systems are limited, however, in that the resistance-to-temperature relationships of different circuits typically overlap. FIG. 1, for example, is a graphical illustration showing two curves 102, 104 representing the resistance vs. temperature relationship for two conventional battery modules where the curves overlap. The overlap region 106 results in ambiguous data since a measurement of a resistance within the overlap region is associated with both of the curves 102, 104. The measurement may correspond to one type of battery module at a low temperature or another type of battery module at a higher temperature. For example, resistance R may correspond to a temperature of T1 if one battery module is used and a temperature of T2 if another battery is connected. This error could lead to catastrophic results. A battery could explode where a battery module is inaccurately identified and an incorrect charging scheme is applied. Further, the dynamic range and accuracy of the temperature measuring circuit is reduced as the number of identification devices is increased as well as requiring a unique voltage-to-temperature transfer function for each of the possible curves. In addition, these problems are exacerbated as the number of IDs is increased.

Accordingly, there is a need for an apparatus, system and method for high resolution identification with temperature dependent resistive devices.

SUMMARY

A temperature measuring and identification (TMID) device obtains identification information and temperature information of a connected device having a temperature sensing circuit (TSC). The TSC includes a temperature sensing element (TSE) connected in parallel with a voltage clamping network (VCN) that limits the voltage across the TSE to an identification voltage within an identification voltage range when the voltage is greater than or equal to a lower voltage of the identification voltage range. When a voltage below the lower range is applied to the TSC, the VCN appears as an open circuit and the resistance of the TSC corresponds to temperature. A translation circuit within the TMID shifts TSC voltages within the identification voltage range to a normalization voltage range. Accordingly, voltages corresponding to temperature as well as voltages corresponding to identification are within the normalization voltage range. As a result, the resolution of a voltage sensing device used for measuring the temperature and identification voltages is maximized. In addition, the translation circuit maintains a minimal current during a rest state. For cost or other concerns, a first TSC may omit the VCN to provide a maximum identification voltage and other TSCs may include VCNs with lower identification voltage ranges.

DETAILED DESCRIPTION

Figure 2A:
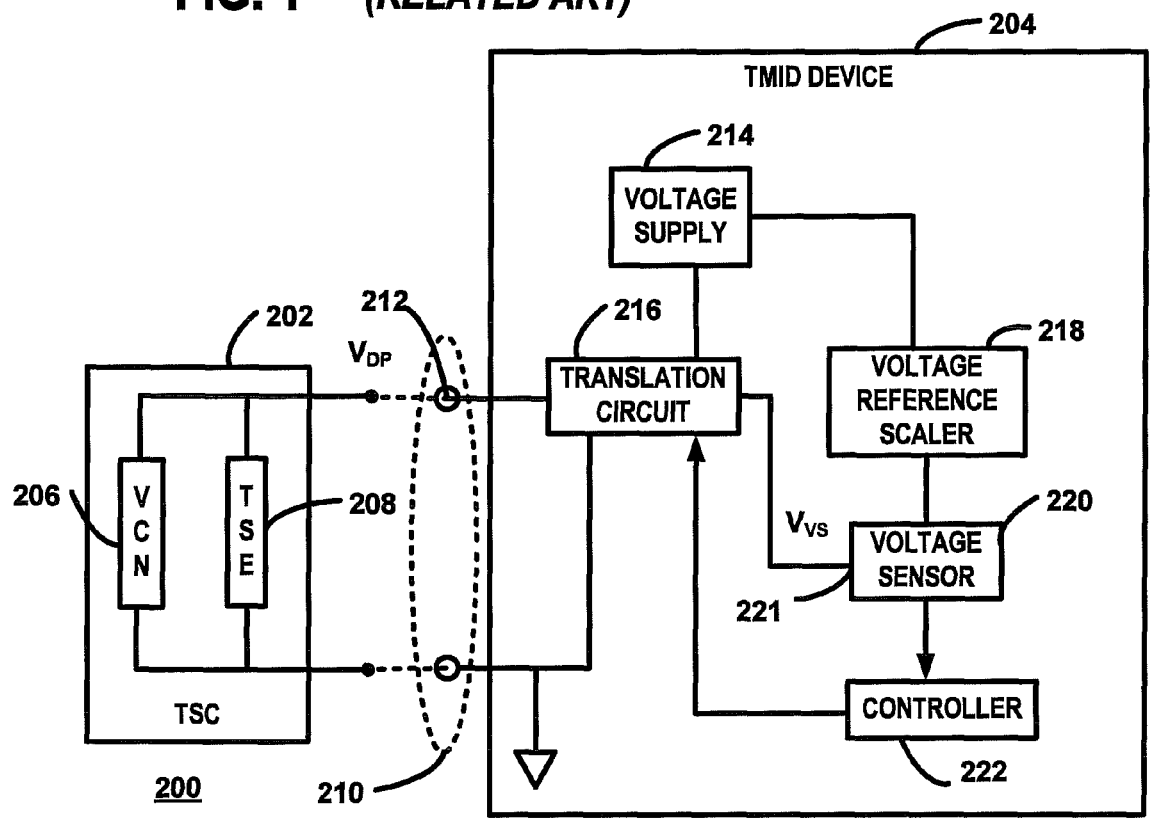
FIG. 2A is a block diagram of a temperature sensing circuit (TSC) connected to a measuring temperature measuring and identification device (TMID device) in accordance with the exemplary embodiment.

FIG. 2A is a block diagram of a temperature sensing circuit (TSC) 202 connected to a temperature measuring and identification (TMID) device 204 to form a temperature measuring and identification circuit 200. As discussed in further detail below, the TSC 202 is one TSC of a set of TSCs where the characteristics of the TSCs allow the TMID device 204 to distinguish between the different sets of TSCs. The TSCs can be installed within different devices providing a mechanism for monitoring the temperature of a device and for identifying the device. An example of suitable application of the temperature measuring and identification circuit 200 includes installing a different TSC within each type of battery module accepted by a portable device. The TMID device 204 can be implemented as part of portable device to identify different types of battery modules and to determine the temperature of the battery module.

Each TSC 202 includes at least a temperature sensing element (TSE) 208. At least one TSCs of a TSC set includes a voltage clamping network (VCN) 206 connected in parallel to the TSE 208. In the exemplary embodiment, a linearization resistor (not shown in FIG. 2) is also connected in parallel to the TSE 208 in all of the TSCs in order linearize the temperature to resistance curves of the TSC 202.

The TMID device 204 connects to the TSC 202 through a connection interface 210 that includes at least a detector port 212. The connection interface 210 may include any of numerous types of connectors, contacts, or electrical connection mechanisms to provide an electrical connection between the TMID device 204 and the TSC 202. The exemplary connection interface 210 also includes a ground connector. Additional contacts may be used for other signals in some circumstances.

As described below, each set of TSCs of the plurality of TSCs includes a different VCN where the VCN may include any combination of resistors and/or voltage clamping devices, such as diodes. The VCN may be omitted from one set of TSCs to create an identification value (ID) that is not voltage clamped. When the TSC is connected to the TMID device 204, the voltage at the detection port 212 depends on the particular VCN 206, the temperature, and the status of voltage source 214 in the TMID device 204. The VCN limits the detector port voltage to a voltage within an ID voltage range. The number of ID voltage ranges depends on the number of TSC sets that can be connected to the TMID device 204.

The TMID device 204 includes a voltage supply 214 connected to the detection port 210 through a translation circuit 216. A voltage reference scaler 218 scales the supply voltage to a voltage that is less than the supply voltage to provide a reference voltage to a voltage sensor 220. A controller 222 is configured to control the translation circuit 216 and to receive a voltage measurement from the voltage sensor 220. In response to a control signal, the translation circuit 216 provides an identification voltage bias to the TSC 202 during a device identification state and a temperature voltage bias during a temperature measuring state. During the identification state, the translation circuit 216 shifts the voltage at the TSC to the normalization voltage range. Based on the voltage measurement and the status of the control signal, the controller 222 determines the temperature of the TSE 208 and an ID of the TSC 200 from a plurality of IDs. As discussed below, the voltage sensor 220 and the controller 222 are implemented within a processor in the exemplary embodiment.

The TMID device 204 controls the voltage at the detection port (VDP) by switching transistors within the translation circuit 216. During the identification state, a sufficiently high current is applied to the detection port to invoke the voltage clamping function of the VCN 206 while a scaling network scales the clamped voltage to a corresponding value within the normalization voltage range. During the temperature measuring state, the current into the detection port is sufficiently reduced to prevent the voltage clamping function allowing the voltage sensor 218 to measure the resistance of the TSE which is used to determine the temperature. In this temperature measuring state, the voltage ($V_{DP}$) measured by the voltage sensor 220 at the detection port 212 is processed by the controller 222 to determine the temperature of the TSE 208 or to determine that an error condition exists. Where the detected voltage is within a temperature measuring voltage range, the voltage ($V_{DP}$) at the detection port corresponds to the resistance of the TSE 208 and the controller 222 calculates the temperature based on the detected voltage. If the voltage is outside the range, the controller 222 determines that an error condition exists.

The voltage sensor 220 is an analog to digital converter (ADC) in the exemplary embodiment. The voltage reference scaler 218 provides a reference voltage that is at or near the maximum value of the normalization voltage range. Accordingly, the number of quantization levels of the ADC used for measuring voltage is increased. The increased resolution improves the accuracy of the measurements. For example, if the supply voltage is equal to Vdd and the reference voltage to the ADC is Vdd/2, the normalization voltage range may be set to 0 to Vdd/2 and all of the quantization levels of the ADC are distributed between 0 and Vdd/2. As compared to a system that does not shift the VDP voltage to a normalization voltage range, the ADC resolution and accuracy will be almost double.

Figure 2B:
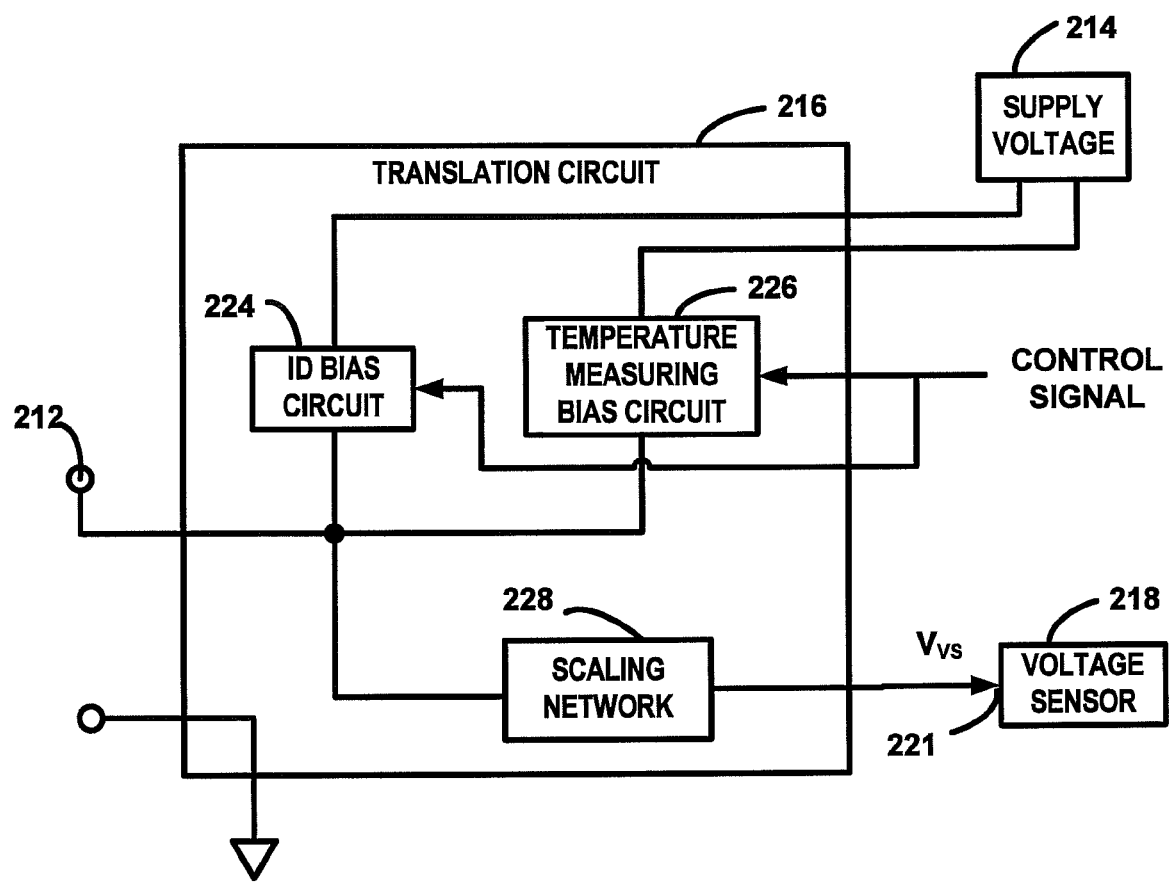
FIG. 2B is a block diagram of a translation circuit in accordance with the exemplary embodiment.

FIG. 2B is a block diagram of a translation circuit 216 in accordance with the exemplary embodiment. Although the functional blocks shown in FIG. 2B may be implemented using any combination of firmware hardware and/or software, the translation circuit 216 includes an arrangement of transistors and resistors as well as other electrical components in the exemplary embodiment. The translation circuit 216 comprises an ID bias circuit 224, a temperature measuring bias circuit 226 and a scaling network 228. During the identification state, the control signal activates the ID bias circuit 224 and the temperature measuring bias circuit 226 to provide a sufficiently high voltage at the detection port 212 to activate the VCN 206. As explained below in further detail, a network of transistors and resistors connected to the supply voltage 214 establish a bias voltage as the detection port 212. The resulting voltage (VDP) at the detection port depends on the particular VCN 206. The scaling network 228 scales the voltage to a corresponding value within the normalization voltage range.

In the temperature measuring state, the control signal is changed to a level that deactivates the ID bias circuit 224. The temperature measuring bias circuit 226, however, remains active and provides a voltage that is less than the ID voltage range of the VCN 206. In the exemplary embodiment, a charge storage element, such as capacitor, maintains an appropriate control voltage at the temperature measuring bias circuit 226 for a time sufficiently long to allow a measurement of the detection port voltage. The scaling network is at least partially inactivated to maximize the dynamic range of the detection port voltage.

Figure 3A:
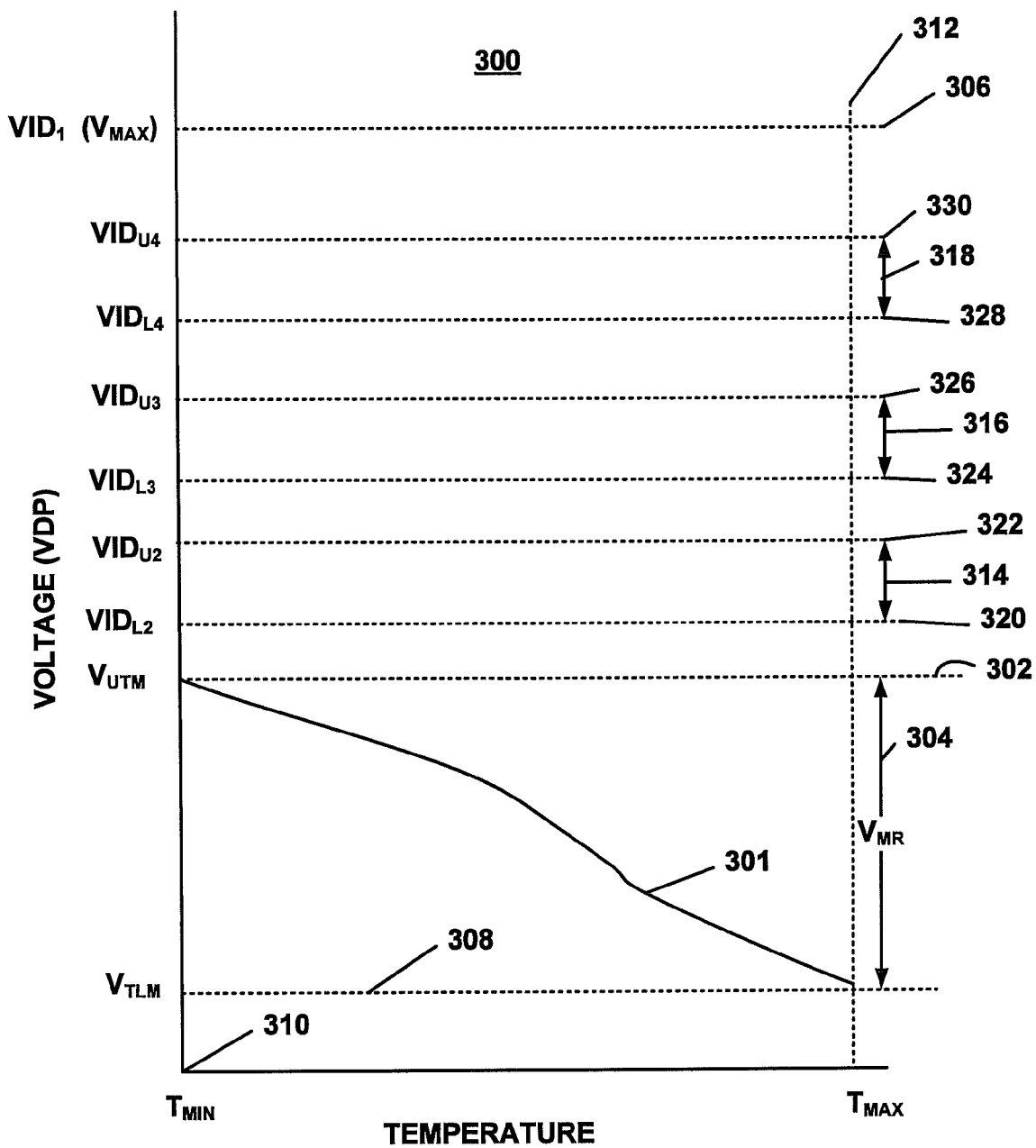
FIG. 3A is a graphical illustration of the voltage ($V_{DP}$) at the detection port during measuring, diagnostic, and identification procedures in accordance with the exemplary embodiment.
Figure 3B:
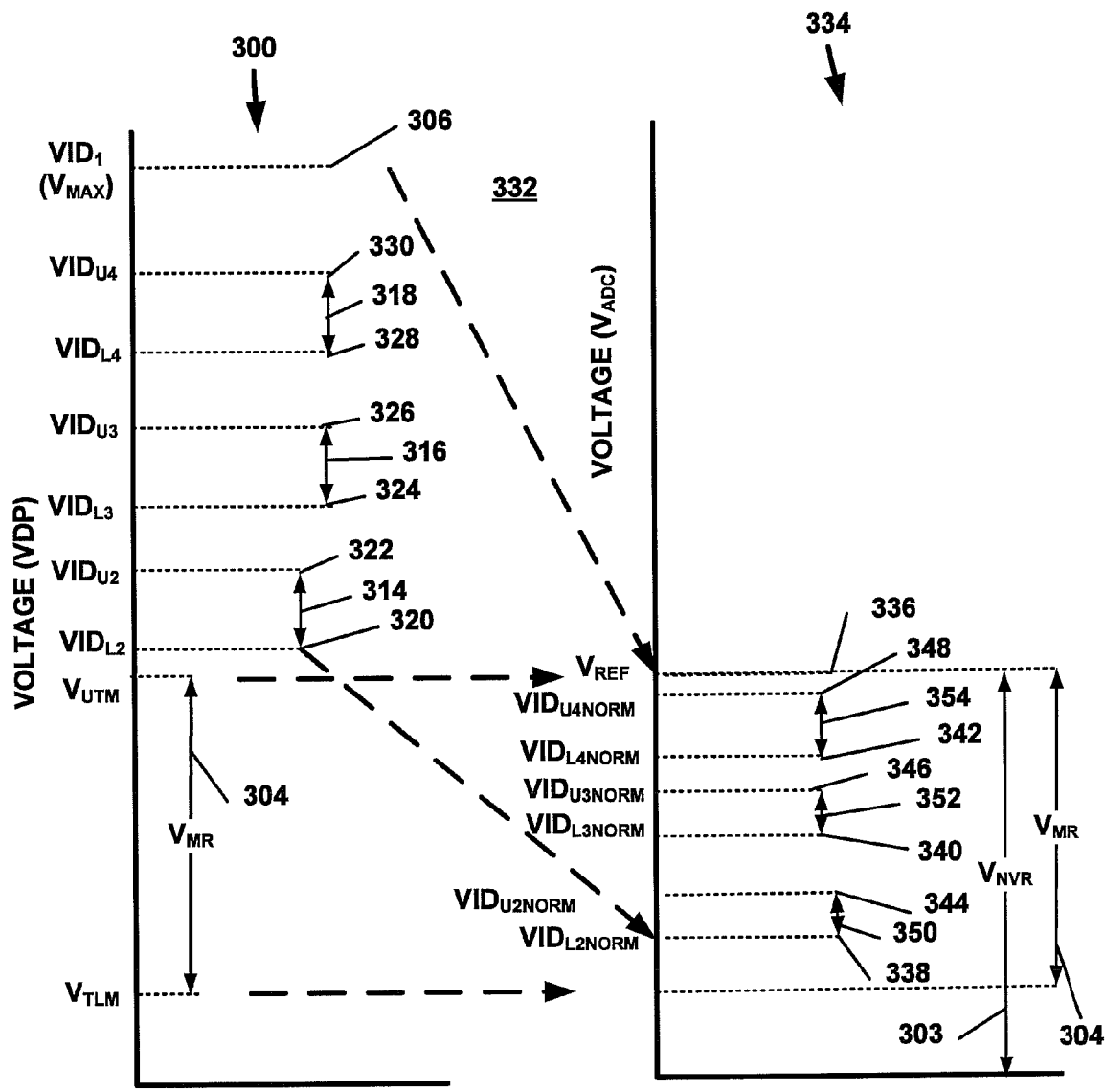
FIG. 3B is a graphical illustration of the voltage ($V_{DP}$) and a translated voltage range for a system having four identification values in accordance with the exemplary embodiment.

FIG. 3A is a graphical illustration of the voltage ($V_{DP}$) at the detection port 212 during measuring, diagnostic, and identification procedures. FIG. 3B is a graphical illustration of the voltage ($V_{VS}$) at the input 221 to the voltage sensor 220 and a relationship 334 between the detection port voltage ($V_{DP}$) and the voltage sensor input voltage ($V_{VS}$). The various values and ranges depicted in FIG. 3A and 3B are not necessarily to scale and are provided to generally illustrate relationships between different voltages and temperatures during different conditions. The graphical illustrations show an example of the relationship 334 between the detection port voltage and the voltage at the input to the voltage sensor 220 where the translation circuit shifts the $V_{DP}$ voltages to a normalization voltage range 303. In the interest of brevity and clarity values shown in FIG. 3A and 3B may be approximations of actual values observed in practice due to characteristics of the components of the TMID. For instance, the illustrated example indicates that the translation circuit does not shift the detection port voltages during the temperature measuring state and the detection port voltage appears at the input of the voltage sensor 220. The actual voltage at the voltage sensor input 221, however, may vary from the detection port voltage as result of voltage drops due to current flowing into the voltage sensor 220.

During the temperature measuring state, only the temperature measuring bias circuit is active and the voltage ($V_{DP}$) indicates a temperature or an error condition. If the voltage ($V_{DP}$) is above an upper temperature measuring voltage ($V_{UTM}$) 302 of the temperature measuring voltage range ($V_{MR}$) 304, the voltage sensor 220 detects a voltage ($V_{VS}$) that is at maximum quantization level and the controller 222 determines that no TSC 202 is connected to the TMID device 204. If the voltage ($V_{DP}$) is at or near the supply voltage (Vdd) of the TMID device 204, for example, the voltage indicates that no current is flowing through the detection port 212 and that no circuit is connected to TMID device 204. The corresponding voltage ($V_{VS}$) at the voltage sensor input 221 is above the reference voltage ($V_{REF}$) 336 and the ADC is "railed" high. If the voltage is below a lower temperature measuring voltage ($V_{TLM}$) 308 of the temperature measuring voltage range ($V_{MR}$) 304, the controller 222 determines that something other than a valid and properly operating TSC is connected to the TMID device 204. For example, a voltage near zero can indicate a short circuited detection port 212 that may be due to a failed TSC or an invalid TSC device that is not intended to be connected to the TMID device 204. If, during the temperature measuring state, the voltage ($V_{DP}$) is within the temperature measuring voltage range ($V_{MR}$) 304, the voltage ($V_{DP}$) and the input voltage ($V_{VS}$) correspond to a temperature of the TSE 202 where the temperature may be measured between a minimum temperature ($T_{MIN}$) 310 and a maximum temperature ($T_{MAX}$) 312. In the exemplary embodiment, where the TSE is an NTC thermistor, a maximum voltage ($V_{UTM}$) corresponds to the minimum temperature ($T_{MIN}$). The relationship between detector port voltage ($V_{DP}$) and temperature follows a temperature curve 301. The shape of the curve 301 depends on the temperature sensing element (TSE) 208 characteristics as well as other components in the circuit. In the exemplary embodiment, a linearization resistor is connected in parallel with the TSE 208 in order to make the curve 301 more linear as compared to a TSC that includes a TSE without a linearization resistor.

During the identification state, the detection port voltage ($V_{DP}$) corresponds to an identification value (ID) of the TSC 202. The scaling network 228 shifts the detection port voltage ($V_{DP}$) to within the normalization voltage range 303. The voltage sensor input voltage ($V_{VS}$) corresponding to the detection port voltage indicates the ID of the TSC 202. In the exemplary embodiment, the scaling network 228 slightly compresses the detection port ID voltage range. As explained in further detail below, the scaling network includes a voltage divider in the exemplary embodiment resulting in a non-zero minimum value of the shifted voltage sensor input voltage. A detection port voltage above the upper temperature measuring voltage ($V_{UTM}$) 302 is associated with one of at least two ID voltages or ID voltage ranges. The number of voltage IDs depends on the number of TSCs in the set of TSCs that may be connected to the TMID device 204. When both bias circuits 224, 226 are active, the controller 222 determines the ID of the TSC 202 based on the voltage ($V_{VS}$) at the voltage sensor that corresponds to the voltage ($V_{DP}$) at the detection port 212. The bias circuits 224, 226 and voltage supply 214 are configured to provide a detection port voltage above the upper temperature measuring voltage temperature ($V_{UTM}$) 302 when the voltage source 214 is on. An example of a suitable scheme includes having one TSC that does not include a VCN and that results in a first ID voltage (VID1) that is near the maximum voltage 306 and that corresponds to a first (ID1), a second TSC that includes a VCN that limits the voltage near $V_{UTM}$ 302 to define a second ID (ID2), and additional TCSs that include VCNs that result in ID voltage ranges that are between the ID voltage (VID1) and the second ID voltage (VID2). The maximum number of ID voltage ranges depends on the available voltage range between the $V_{UTM}$ and the maximum voltage 306 as well as the size of the ID voltage ranges. The maximum voltage 306 is the voltage corresponding to the minimum temperature since the thermistor has a maximum resistance at the minimum temperature. As explained below, the various components are selected such that the worst case maximum voltage of the thermistor is less than conduction voltage of the VCN that occurs at the lowest operating temperature.

FIG. 3A and FIG. 3B illustrate an exemplary system that supports four IDs although any combination and number of ID voltages may be used to group TSCs into ID categories. A first ID voltage 306 results when a first type TSC that does not include a VCN is connected to the TMID device 204 and the voltage source 214 is on. A second ID voltage results within a voltage range 314 when a second type TSC that includes a VCN is connected to the TMID device 204 and the voltage source 214 is on. ID voltages result within a third voltage range 316 and a fourth voltage range 318 when a third type TSC and a fourth type TSC are connected to the TMID device 204, respectively.

The translation circuit 216 shifts the ID voltage ranges of the detection port to normalized ID voltage ranges at the voltage sensor input 221. Therefore, each upper ID voltage 322, 326, 330 and each lower ID voltage 320, 324, 328 of each ID voltage range 314, 316, 318 are shifted to a corresponding lower normalized ID voltage 338, 340, 342 and upper normalized ID voltage 344, 346, 348 of corresponding normalized ID voltage range 350, 352, 354, respectively. When the voltage sensor 220 indicates a voltage ($V_{VS}$) at the input 221 that is within a normalized ID voltage range, the controller 222 determines that the TSC connected to the TMID device has an ID corresponding to the normalized ID voltage range. Therefore, the controller 222 determines that the TSC has one of four IDs for the scheme illustrated in FIG. 3A and FIG. 3B. As discussed below, the IDs associated with an ID voltage range correspond to the TSCs that include VCNs. Since the voltage clamping devices within the VCN, such as diodes, have a forward voltage threshold that varies between devices and over temperature, the ID voltage resulting from a particular TSC may vary from a lower voltage to an upper voltage of the corresponding ID voltage range. Accordingly, the second ID voltage range 314 includes a lower voltage ($VID_{L2}$) 320 and an upper voltage ($VID_{U2}$) 322, the third ID voltage range 316 includes a lower voltage ($VID_{L3}$) 324 and an upper voltage ($VID_{U3}$) 326, and the fourth ID voltage range 318 includes a lower voltage ($VID_{L4}$) 328 and an upper voltage ($VID_{U4}$) 330.

Figure 1:
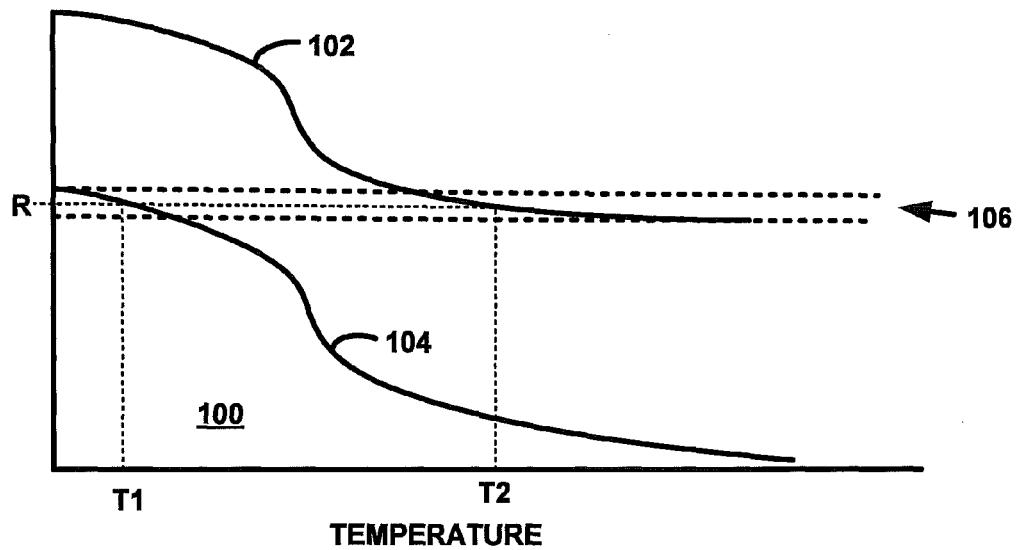
FIG. 1 is a graphical illustration of a resistance to temperature relationship of two conventional identification and temperature sensing circuits.
Figure 4:
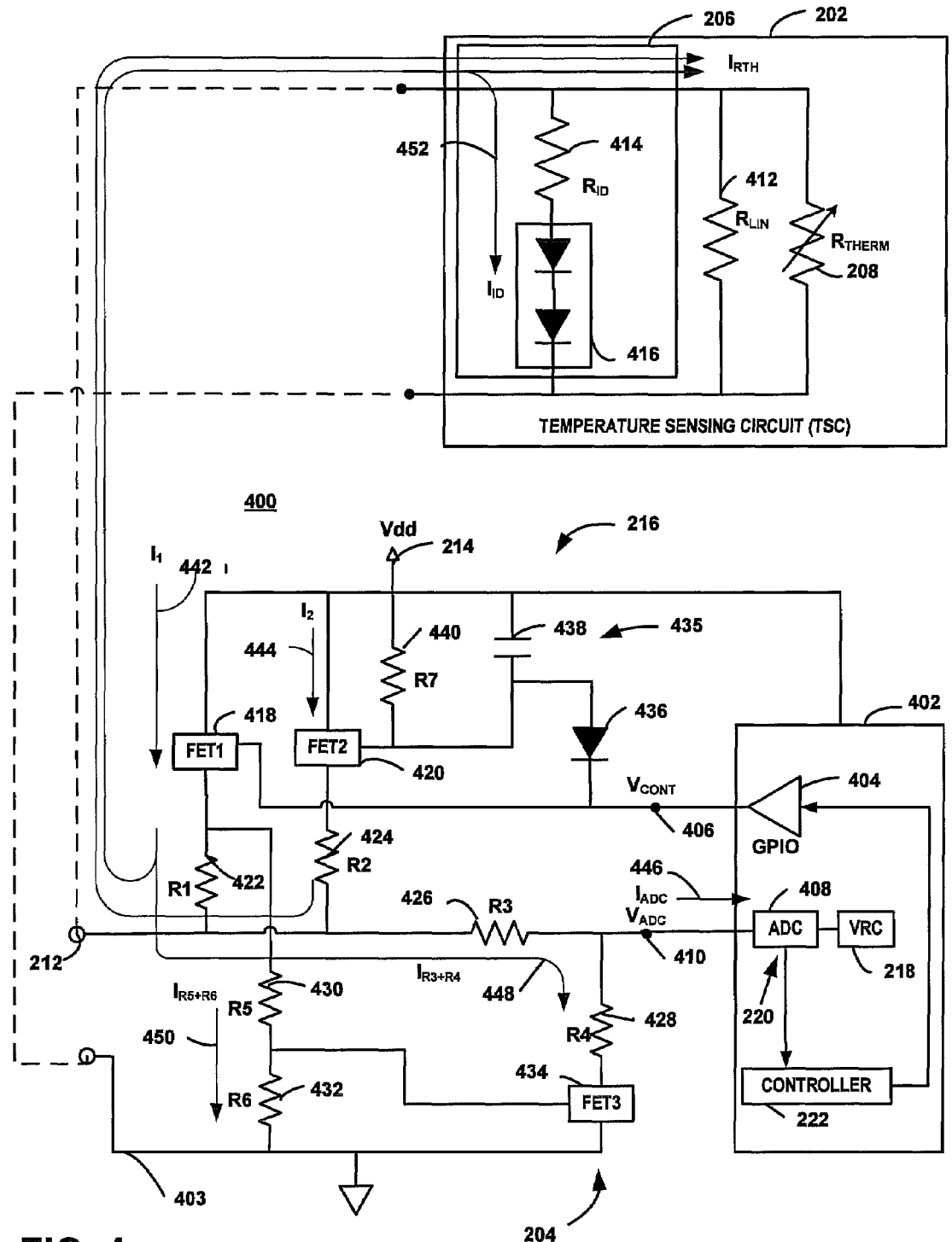
FIG. 4 is a schematic representation of an exemplary implementation of the temperature measuring and identification device (TMID device) where the translation circuit includes field effect transistors (FETs).

FIG. 4 is a schematic representation of an exemplary implementation 400 of the temperature measuring and identification circuit 100 where the voltage sensor 220, and the controller 222 are implemented within a processor 402. The various components and functions described above with reference to FIG. 1 can be implemented using other combinations of hardware, software, and/or firmware. In the exemplary implementation, the controller 222 controls a general purpose input/output (GPIO) port 404 of the processor 402 to generate the control signal. The processor 402 may be any type of general purpose processor, application specific integrated circuit (ASIC), or other microprocessor or processor arrangement, that can perform the functions described herein. Code running on the processor 402 facilitates the functions of the controller 222 as well as other functions of the TMID device 204. In the example discussed with reference to FIG. 4, the transistors are field effect transistors (FETs). Other types of transistors or switching elements may be used in some circumstances to perform the described functions.

The controller 222 controls the GPIO port 404 to place the GPIO port 404 in an output (on) state and an off state. In the output state, the GPIO port 404 provides a voltage at or near the supply voltage (Vdd). In the off state, the GPIO port 404 presents a voltage at or near ground (0V). As described below in further detail, the control signal, having a voltage ($V_{CONT}$) 406, activates transistors within the translation circuit 216 to place the circuit 216 in a rest state or an identification (ID) state. Circuit elements within the translation circuit 216 enable a temperature measuring state during a time period when the translation circuit 216 transitions from the ID state to the rest state. An analog-to-digital converter (ADC) 408 measures the voltage ($V_{ADC}$) at the output 410 of the translation circuit 216 by providing the controller 222 with a digital representation of the voltage ($V_{ADC}$). The elements of the TSC 202 form circuits with the translation circuit 216 where the detection port voltage ($V_{DP}$) corresponds to the ADC-measured voltage ($V_{ADC}$) to allow a temperature measurement in the temperature measuring state and an identification value (ID) when the translation circuit 216 is in the ID state.

Any one of at least two TSCs 202 can be connected to the TMID device 204. FIG. 4 illustrates a TSC 202 that includes a linearization resistor ($R_{LIN}$) 412, a TSE 208 and a VCN 206, where the TSE 208 is a thermistor 208 and the VCN 206 includes an identification resistor ($R_{ID}$) 414 in series with a voltage clamping device 416. In the exemplary implementation, the voltage clamping device 416 is a diode arrangement 416 that includes one or more diodes that have a forward voltage within a forward voltage range. The voltage range depends on the number and type of diodes. For example, a typical PN junction, silicon diode has a forward voltage of approximately 0.7 volts. Two silicon diodes in series will have a collective forward voltage of about 1.4 volts. Due to manufacturing variations and other factors, the forward voltage of a particular diode may be greater than or less than the expected voltage drop. Further, the forward voltage varies over temperature. Accordingly, a voltage range is defined for the diode arrangement 416 where any particular diode arrangement will have a forward voltage within the range. Examples of other suitable diode arrangements include arrangements using single Zener diodes and active Zener diodes. Zener diodes can be used with reverse bias to maintain a fixed voltage across their terminals. In addition, the voltage clamping variations of Zener diodes are typically less than the forward voltage variations of PN junction silicon diodes over temperature, bias current and manufacturing variations. Active Zener diodes may be preferred in some circumstances since active Zener diodes, also known as "shunt regulators" have variations in clamping voltages lower than normal Zener diodes.

During the rest state of the TMID 204, the GPIO port 404 is set to a control voltage ($V_{CONT}$) 406 at or near the supply voltage (Vdd). In the exemplary embodiment, the first field effect transistor (FET1) 418 and the second field effect transistor (FET2) 420 are P channel FETs. Accordingly, when the GPIO port 404 is set to a logic level "high" near Vdd, the two FETs 418, 420 are off and no current flows through the translation circuit 216. Therefore, the rest state of the TMID 204 provides a minimum current draw.

During the ID state, the GPIO port 404 is set to an off state where the voltage at the GPIO port 404 is at, or near, zero volts. As a result of the low voltage at the gates of the FETs 418, 420, the first FET (FET1) 418 and second FET (FET2) 420 are turned on. For this discussion, the resistances of FET1 418 and FET2 420 are considered to be much less than the resistances of a first resistor (R1) 422 and second resistor (R2) 424. The second resistor (R2) 424 has resistance value such that if the first FET (FET1) 418 is off, voltage at the detection port 212 will not be sufficient to activate the clamping function of the VCC 206. The resistance value of the first resistor (R1) 422, however, is sufficient to activate the clamping function of the VCC 206. Accordingly, the voltage ($V_{DP}$) at the detection port 212 is clamped at the ID voltage established by the VCC 206 when the GPIO port is at logic level low and the FETs are on. In this state, the detection port voltage is shifted by the translation circuit 216 to provide a normalized voltage at the ADC 408. The voltage divider formed by the third resistor (R3) 426 and fourth resistor (R4) 428 reduces the ID voltage at the detection port 212 to the normalized ID voltage at the ADC 408. When the first FET (FET1) 418 is on, current flows through the voltage divider formed by the fifth resistor (R5) 430 and the sixth resistor (R6) 432. The resulting voltage across the sixth resistor (R6) 432 is sufficient to turn on the a third FET (FET3) 434. As a result, the fourth resistor (R4) 428 forms the voltage divider with the third resistor (R3) 426. The ADC 408 converts the analog voltage measurement at the output 410 of the translation circuit 216 to a digital value that is processed by the controller 222 to determine the identification value of the TSC 202.

The GPIO port 404 is switched from low to high to perform a temperature measurement. Immediately after the GPIO is switched to logic high, the voltage at the gate of the first FET (FET1) 418 reaches a voltage sufficiently high to turn off the first FET (FET1) 418. A bias storage circuit 435 keeps the gate of the second FET (FET2) 420 at a voltage sufficient to keep the second FET on, however. For the example, the bias storage circuit 435 includes a diode 436, a capacitor 438 and a resistor 440. Due to the diode 436 between the gate of the second FET (FET2) 420 and the GPIO port 404, the second FET (FET2) 420 remains on for a time period. The RC network formed by the capacitor 438 and a seventh resistor (R7) 440 keeps the second FET (FET2) 420 on until the capacitor 438 discharges sufficiently to establish a gate-to-source voltage ($V_{gs}$) that is less than the threshold $V_{gs}$ of the second FET (FET2) 420. The second FET (FET2) 420 is turned off when the $V_{gs}$ voltage drops below the $V_{gs}$ threshold. A temperature measurement is obtained during the time period when the first FET (FET1) 418 is off and the second FET (FET2) 420 is on. During this time period, the third FET (FET3) 434 is off and the fourth resistor (R4) 428 does not form a voltage divider with the third resistor (R3) 426. Accordingly, the voltage ($V_{DP}$) at the detection port 212 is not scaled or shifted during the temperature measuring state to provide a voltage at the ADC 404 that is essentially equal to the voltage ($V_{DP}$) at the detection port 212. Since the second resistor (R2) 424 is selected such that the highest possible voltage at the detection port 212 is half of the supply voltage (Vdd/2), the voltage at the ADC 404 ranges between 0 and Vdd/2. As discussed above, the voltage reference 218 is set to Vdd/2 allowing the full resolution of the ADC 404 to be used for temperature measurements.

The values of the components in the exemplary embodiment depend on the particular implementation should and are in accordance with the following general criteria.

$$I_2 < I_1; \quad (1)$$

$$I_{ADC} << I_2; \quad (2)$$

$$I_{ADC} << I_{R3+R4}; \quad (3)$$

$$I_{R5+R6} << I_2; \quad (4)$$

$$I_{R3+R4} << I_1 + I_2; \quad (5)$$

$$I_{GFET3} @ I_2 < V_{GSTHFET3} < Vdd; \text{ and} \quad (6)$$

$$I_{RTH} << I_1; \quad (7)$$

where $I_1$ is the current 442 through the first FET (FET1) 418, $I_2$ is the current 444 through the second FET (FET2) 420, $I_{ADC}$ is the current 446 into the ADC 408, $I_{R3+R4}$ is the current 448 through the fourth resistor (R4) 428; and $I_{R5+R6}$ is the current 450 through the sixth resistor (R6) 432. The current flow in the translation circuit may be modeled such that $I_1$ has a component current ($I_{ID}$) 452 that flows through the VCC 206, a component current ($I_{RTH}$) that flows through the parallel combination of the thermistor 208 and linearization resistor 412, a component current ($I_{R5+R6}$) 450 that flows through the sixth resistor (R6) 432 and a component current ($I_{R3+R4}$) that flows through the fourth resistor (R4) 428.

Figure 5:
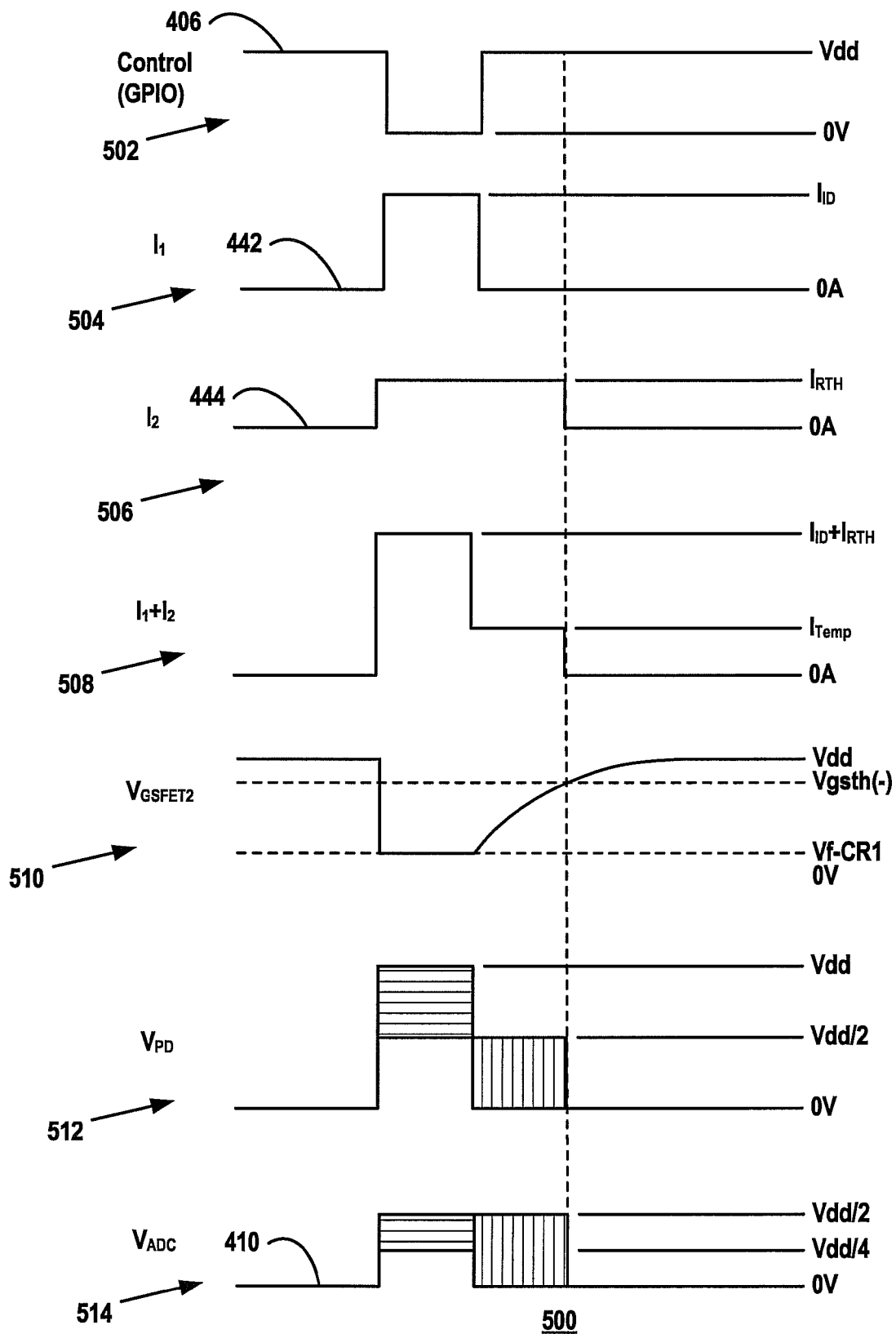
FIG. 5 is a graphical illustration of a relationship between the currents and voltages in a translation circuit in accordance with the exemplary embodiment.

FIG. 5 is a graphical illustration of a relationship 500 between the currents and voltages in the translation circuit 216. A first graph 502 illustrates the control voltage 406 as the GPIO port is switched from a logic high to a logic low and back to the logic high. A second graph 504 shows the current ($I_1$) 442 through the first FET 418. As illustrated, the current ($I_1$) 442 transitions from zero amps to the current ($I_{ID}$) 452 through the VCC 206 when the control voltage is switched to low. A third graph 506 shows the current ($I_2$) 444 through the second FET 420 transition from zero amps to the current ($I_{RTH}$) through the thermistor-resistor combination when the control voltage switches from high to low. A fourth graph 508 shows the sum of the FET currents (I1 and I2) transition from zero to the total current ($I_{ID}+I_{RTH}$) through the TSC 202 when the control voltage is switched from high to low. When the control voltage is switched to high, the current through the second FET continues to flow until the gate voltage of the second FET drops blow the Vgs threshold (Vgsth(−)) of the second FET which is shown is the fifth graph 510. During this time period, the current in the fourth graph is equal to the current through the thermistor and linearization resistor combination and, therefore, indicates the temperature of the TSC 202. The sixth graph 512 shows the voltage ($V_{DP}$) at the detection port 212 to be between Vdd/2 and Vdd when the control voltage is low. During the temperature measuring state, the $V_{DP}$ is between 0V and Vdd/2. The translation circuit 216 translates the $V_{DP}$ to the $V_{ADC}$ 410 shown in the seventh graph 514 where the ID voltages range from Vdd/4 to Vdd/2 and the temperature voltages range from 0 to Vdd/2.

Figure 6:
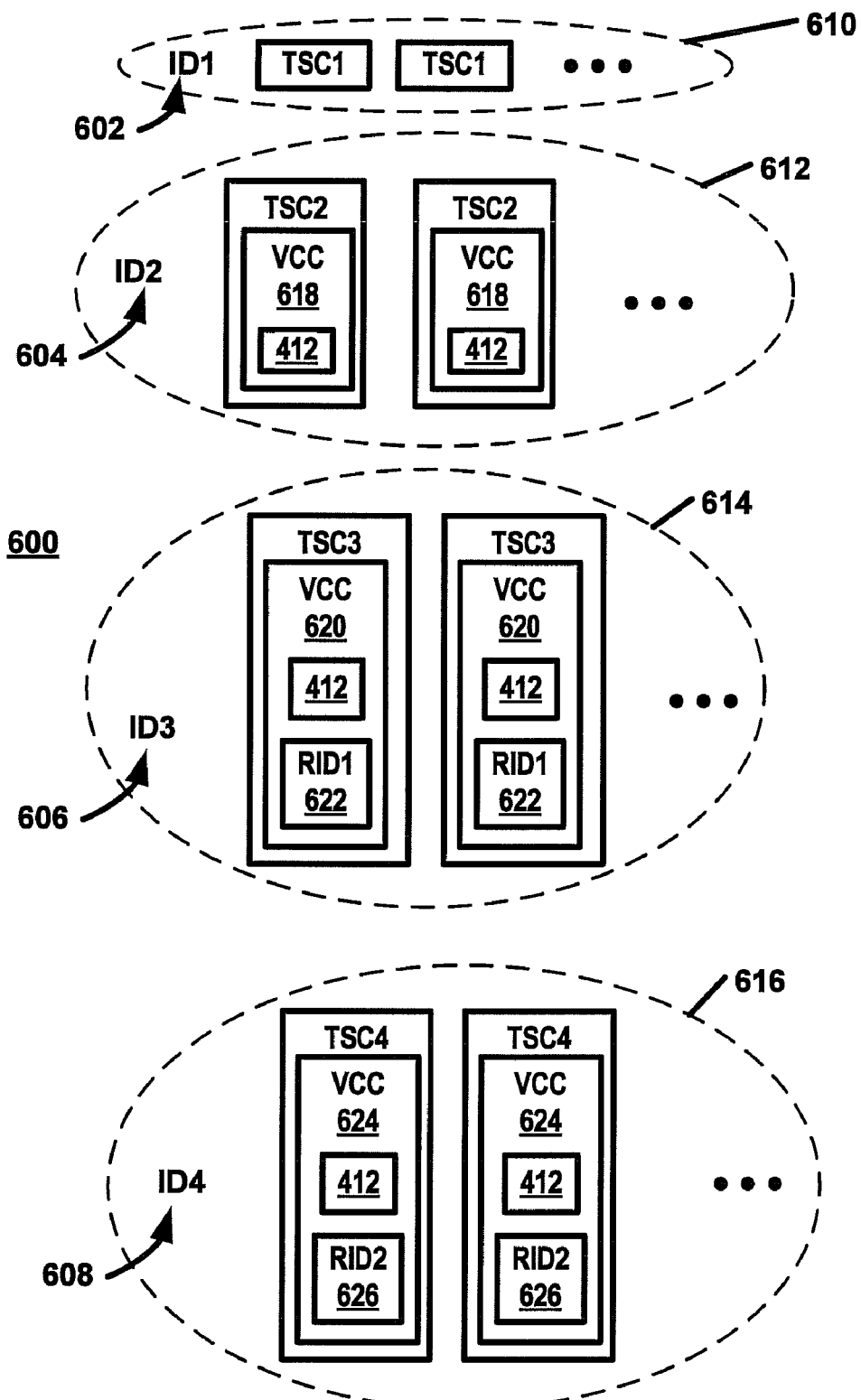
FIG. 6 is a block diagram of a plurality of temperature sensing circuits (TSCs) of an identification system including four identification values (IDs) in accordance with the exemplary embodiment.

FIG. 6 is a block diagram of a plurality of temperature sensing circuits (TSCs) 600 of an identification system including four identification values (IDs) 602, 604, 606, 608. The TSCs of a first set of TSCs 610 have a first identification value (ID1) 602, the TSCs of a second set of TSCs 612 have a second identification value (ID2) 604, TSCs of a third set of TSCs 614 have a third identification value (ID3) 606, and the TSCs of a fourth set of TSCs 616 have a fourth identification value (ID4) 608. In the exemplary system, the TSCs of the first set 610 include only a temperature sensing element 208 and a linearization resistor 408 and do not include a VCN. Accordingly, ID1 corresponds to the first voltage ID 306 shown in FIG. 3.

The TSCs of the second set 612 include a temperature sensing element 208, a linearization resistor 412, and a VCN 414 that includes a voltage clamping device 416. The VCN 618 does not include an identification resistor 410. Accordingly, the second ID corresponds to the second ID voltage range 314.

The TSCs of the third set 614 include a temperature sensing element 208, a linearization resistor 408, and a VCN 620 that includes a voltage clamping device 416 and an identification resistor 414 having a first ID resistance 622. The third ID corresponds to the third ID voltage range 316.

The TSCs of the fourth set 616 include a temperature sensing element 208, a linearization resistor 412, and a VCN 624 that includes a voltage clamping device 416 and an identification resistor 414 having a second ID resistance 626. The fourth ID corresponds to the fourth ID voltage range 318.

The values of the components of the TSC 202 and the TMID device 204 are selected based on the number of IDs, the desired temperature measuring range, the supply voltage and other factors. Typically, the worst case upper voltage limit corresponds to the minimum temperature of a negative temperature coefficient (NTC) thermistor. Accordingly, the values of the components are selected such that the worst case upper voltage limit is less than the lowest forward voltage limit of the voltage clamping device 416 (diode arrangement) which typically occurs at the highest temperature due to the negative temperature coefficient of the diode. The maximum dynamic range for a temperature measurement can be achieved by using an appropriately low reference during the temperature conversion.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A temperature measuring and identification (TMID) device for determining an identification value and a temperature of an identification device comprising a voltage clamping network in parallel with a temperature sensing element, the voltage clamping network configured to limit a voltage at a detection port to an identification voltage range when the voltage is greater than or equal to a lower voltage of the identification voltage range, the TMID device comprising:

a translation circuit, operatively coupled to the detection port, configured to shift the voltage to a normalized identification voltage within a temperature measuring voltage range during an identification state, the temperature measuring voltage range having an upper temperature measuring voltage less than a clamped voltage resulting from the voltage clamping network limiting the voltage; and a controller, operatively coupled to the translation circuit, for determining the identification value based on the normalized identification voltage.

2. The TMID device of claim 1, wherein the translation circuit is further configured to present, at the detection port during the identification state, an identification measuring voltage sufficiently high to invoke a clamping function of the voltage clamping network to produce the clamped voltage at the detection port.

3. The TMID device of claim 2, wherein the translation circuit is further configured to present, at the detection port during a temperature measuring state, a temperature measuring voltage sufficiently low to avoid invoking the voltage clamping function.

4. The TMID device of claim 2, wherein the translation circuit is configured to provide:
the normalized identification voltage within a normalized voltage range at a translation circuit output during an identification state, the normalized identification voltage corresponding to the clamped voltage at the detection port; and
a temperature measuring voltage within the normalized voltage range at the translation circuit output, the temperature measuring voltage resulting from a current flowing through the temperature sensing element during a temperature measuring state.

5. The TMID device of claim 4, further comprising:
an analog to digital converter (ADC), operatively coupled to the translation circuit and to the controller, configured to convert an output voltage at the translation circuit output to generate a digital identification voltage during the identification state and to generate a digital temperature measuring voltage during the temperature measuring state, wherein the controller is configured to determine an identification value of the identification device based on the digital identification voltage and to determine the temperature of the identification device based on the digital temperature measuring voltage.

6. The TMID device of claim 5, wherein the detection port is configured to connect to any one of a plurality of identification devices, each identification device comprising a voltage clamping network in parallel with a temperature sensing element.

7. The TMID device of claim 6, wherein when the identification device is connected to the detection port, the translation circuit is further configured to:
present, at the detection port and in response to a first control signal level, an identification measuring voltage sufficiently high to invoke a clamping function of the clamping circuit to produce the clamped voltage at the detection port;
present, at the detection port and in response to a second control signal level, a temperature measuring voltage sufficiently low to avoid invoking the voltage clamping function,
present, at the translation circuit output and in response to the first control signal level, the normalized identification voltage corresponding to the clamped voltage at the detection port and within the normalized voltage range; and
present, at the translation circuit output and in response to the second control signal level, the temperature measuring voltage within the normalized voltage range and corresponding to the temperature of the identification device.

8. The TMID device of claim 7, further comprising:
a first transistor, operatively coupled to a voltage terminal of the TMID device, configured to provide a first current through the identification device in response to the first control signal level and to provide no current in response to the second control signal level;
a second transistor, operatively coupled to the voltage terminal of the TMID device, configured to provide a second current through the identification device in response to a first control signal level; and
a bias storage circuit, operatively coupled to the second transistor, configured to maintain a second transistor bias voltage for a time period after a control signal changes from the first control signal level to the second control signal level to allow the second transistor to provide the second current during the time period.

9. The TMID device of claim 8, further comprising:
two resistors;
a third transistor configured to form a voltage divider with the two resistors in response to the first control signal level, the voltage divider configured to scale the clamped voltage to the normalized voltage, wherein the voltage divider is operatively coupled to the ADC.

10. The TMID device of claim 8, further comprising:
a first resistor connected between a source of the first transistor and the detection port, wherein a gate of the first transistor is configured to receive the control signal; and
a second resistor connected between a source of the second transistor and the detection port, wherein a gate of second transistor is connected to the bias storage circuit.

11. The TMID device of claim 10, wherein the bias storage circuit comprises:
a capacitor connected between a gate of the second transistor and a voltage supply; and
a diode connected between the gate of the second transistor and the gate of the first transistor.

12. The TMID device of claim 8, further comprising a general purpose input/output (GPIO) port, operatively coupled to the controller, configured to generate the control signal in response to the controller.

13. The TMID device of claim 5, where a reference value for the ADC is less than the clamped voltage.

14. The TMID device of claim 13, wherein the reference value is equal to the upper value of the normalized voltage range.

15. The TMID device of claim 4, wherein the clamped voltage is greater than the temperature measuring voltage and greater than a maximum level of the normalized voltage range.

* * * * *